United States Patent
Wuidart

(10) Patent No.: US 8,693,956 B2
(45) Date of Patent: Apr. 8, 2014

(54) RESISTIVE EVALUATION OF THE COUPLING FACTOR OF AN ELECTROMAGNETIC TRANSPONDER

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 136 days.

(21) Appl. No.: 12/815,737

(22) Filed: Jun. 15, 2010

(65) Prior Publication Data

US 2010/0323629 A1  Dec. 23, 2010

(30) Foreign Application Priority Data

Jun. 19, 2009  (FR) ...................................... 09 54148

(51) Int. Cl.
*H04B 17/00* (2006.01)

(52) U.S. Cl.
USPC ...................................... 455/67.11

(58) Field of Classification Search
USPC .......................... 342/118, 127, 42, 44, 51, 47; 340/426.1; 455/67.11
See application file for complete search history.

(56) References Cited

U.S. PATENT DOCUMENTS

| 5,703,573 | A | 12/1997 | Fujimoto et al. | |
| 6,473,028 | B1* | 10/2002 | Luc | 342/118 |
| 6,650,229 | B1 | 11/2003 | Wuidart et al. | |
| 7,049,935 | B1 | 5/2006 | Wuidart et al. | |
| 2003/0071717 | A1 | 4/2003 | Hagl et al. | |
| 2004/0104809 | A1* | 6/2004 | Rizzo et al. | 340/10.34 |
| 2005/0001609 | A1* | 1/2005 | Cuylen | 324/114 |
| 2005/0231328 | A1* | 10/2005 | Castle et al. | 340/10.3 |
| 2007/0164122 | A1* | 7/2007 | Ju | 235/492 |
| 2008/0136643 | A1 | 6/2008 | Yeo et al. | |
| 2008/0204206 | A1* | 8/2008 | Frohler | 340/426.1 |

FOREIGN PATENT DOCUMENTS

| EP | 1071038 A1 | 1/2001 |
| FR | 2757952 A1 | 7/1998 |

OTHER PUBLICATIONS

French Search Report dated Feb. 9, 2010 from corresponding French Application No. 09/54148.
French Search Report dated Feb. 9, 2010 from related French Application No. 09/54147.
French Search Report dated Feb. 3, 2010 from related French Application No. 09/54347.
French Search Report dated Feb. 8, 2010 from related French Application No. 09/54149.
French Search Report dated Feb. 2, 2010 from related French Application No. 09/54345.
French Search Report dated Feb. 17, 2010 from related French Application No. 09/54351.

* cited by examiner

*Primary Examiner* — April G Gonzales
(74) *Attorney, Agent, or Firm* — Wolf, Greenfield & Sacks, P.C.

(57) ABSTRACT

A method for evaluating the current coupling factor between an electromagnetic transponder and a terminal, wherein a ratio between data, representative of a voltage across an oscillating circuit of the transponder and obtained for two values of the resistive load, is compared with one or several thresholds.

32 Claims, 4 Drawing Sheets

RESISTIVE EVALUATION OF THE COUPLING FACTOR OF AN ELECTROMAGNETIC TRANSPONDER

CROSS REFERENCE TO RELATED APPLICATIONS

This application claims the priority benefit of French patent application number 09/54148, filed on Jun. 19, 2009, entitled "RESISTIVE EVALUATION OF THE COUPLING FACTOR OF AN ELECTROMAGNETIC TRANSPONDER," which is hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from the simplest electronic tag used as a theft-prevention device to more complex systems where a transponder intended to communicate with the terminal when it is in its field, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by a near magnetic field when the transponder enters the field of the terminal. The oscillating circuits of the terminal and of the transponder are generally tuned to the same frequency corresponding to the excitation frequency of the oscillating circuit of the terminal.

In most cases, transponders have no autonomous power supply and extract the power supply necessary to their circuits from the high-frequency field radiated by the antenna of the terminal.

The quality of the communication and of the possible power transfer depends on the coupling between the terminal and the transponder. This coupling, which is inversely proportional (non linear) to the distance between the terminal and the transponder, conditions the amplitude of the voltage recovered by the transponder. It is thus needed to be able to evaluate the current coupling factor between a transponder and a terminal in the field generated by the terminal.

SUMMARY OF THE INVENTION

It would be desirable to be able to evaluate the coupling factor between a transponder and a terminal.

It would also be desirable to be able to evaluate the variation of this coupling factor during a communication.

It would also be desirable to be able to evaluate the coupling factor without it being necessary to perform a data exchange between the terminal and the transponder.

It would also be desirable to be able to perform this evaluation on the transponder side.

It would also be desirable to provide a solution independent from the type of terminal having the transponder in its field.

To achieve all or part of these objects as well as other, at least one embodiment of the present invention provides a method for evaluating the current coupling factor between an electromagnetic transponder and a terminal, wherein a ratio between data, representative of a voltage across an oscillating circuit of the transponder and obtained for two values of the resistive load, is compared with one or several thresholds.

According to an embodiment of the present invention:
first data, relative to the level of a D.C. voltage provided by a rectifier across the oscillating circuit, are measured and stored for a first value of the resistive load; and
second data, relative to the level of said D.C. voltage, are measured and stored for a second value of the resistive load.

According to an embodiment of the present invention, the evaluation provides a position of the current coupling factor with respect to an optimum coupling position with one of the two values of the resistive load.

According to an embodiment of the present invention, said thresholds are a function of said values.

According to an embodiment of the present invention, a variation of the resistive load between the first and second values is obtained by modifying the power consumption of processing circuits comprised by the transponder.

According to an embodiment of the present invention, a variation of the resistive load between the first and second values is obtained by switching a resistive retromodulation element comprised by the transponder.

The present invention also provides a method for protecting an electromagnetic transponder against a possible overheating based on an evaluation of the coupling, wherein a detuning of the oscillating circuit is caused if the ratio between the current coupling and the optimum coupling ranges between two thresholds.

The present invention also provides an electromagnetic transponder comprising:
an oscillating circuit upstream of a rectifying circuit capable of providing a D.C. voltage when the transponder is present in the magnetic field of a terminal; and
at least one processing unit programmed to implement the evaluation or protection method.

According to an embodiment of the present invention, the transponder further comprises at least one switchable resistive element capable of being functionally connected in parallel with the oscillating circuit.

According to an embodiment of the present invention, said switchable resistive element is connected to the output terminals of the rectifying circuit.

The foregoing objects, features, and advantages of the present invention will be discussed in detail in the following non-limiting description of specific embodiments in connection with the accompanying drawings.

DETAILED DESCRIPTION

Figure 1:
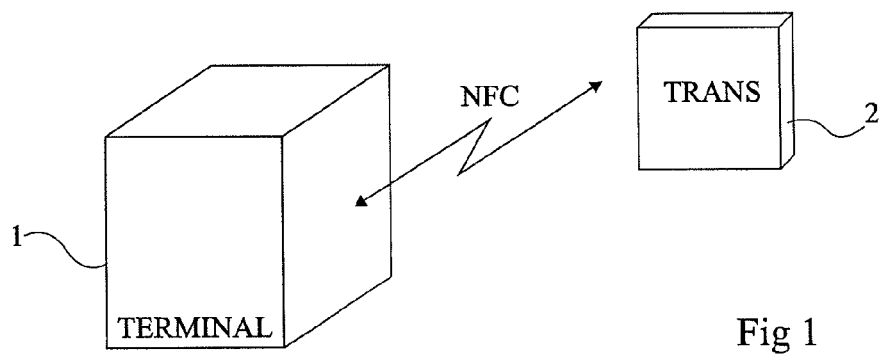
FIG. 1 is a very simplified representation of a transponder system of the type to which the present invention applies as an example.

The same elements have been designated with the same reference numerals in the different drawings. For clarity, only those steps and elements which are useful to the understanding of the present invention have been shown and will be described. In particular, the communications between the transponder and the terminal have not been detailed, the present invention being compatible with any usual communication. Further, the functions that can be implemented by a terminal or by a transponder, other than the determination of the coupling factor by this transponder, have not been detailed either, the present invention being here again compatible with any usual function of a terminal or of a transponder.

FIG. 1 is a block diagram of an electromagnetic transponder communication system. A terminal 1 (TERMINAL) is capable of communicating in near field (for example according to a near field communication protocol NFC) with a distant element, that is, a transponder (TRANS).

The terminal may take different forms, for example, a transport ticket validation terminal, an electronic passport reader, a laptop computer, a mobile telecommunication device (GSM phone, PDA, etc.), an electronic control unit for starting an automobile vehicle, etc.

The transponder may similarly take different forms, for example, a chip card, an electronic transport ticket, an electronic passport, a telecommunication terminal (GSM phone, PDA, etc.), an electronic tag, etc.

Figure 2:
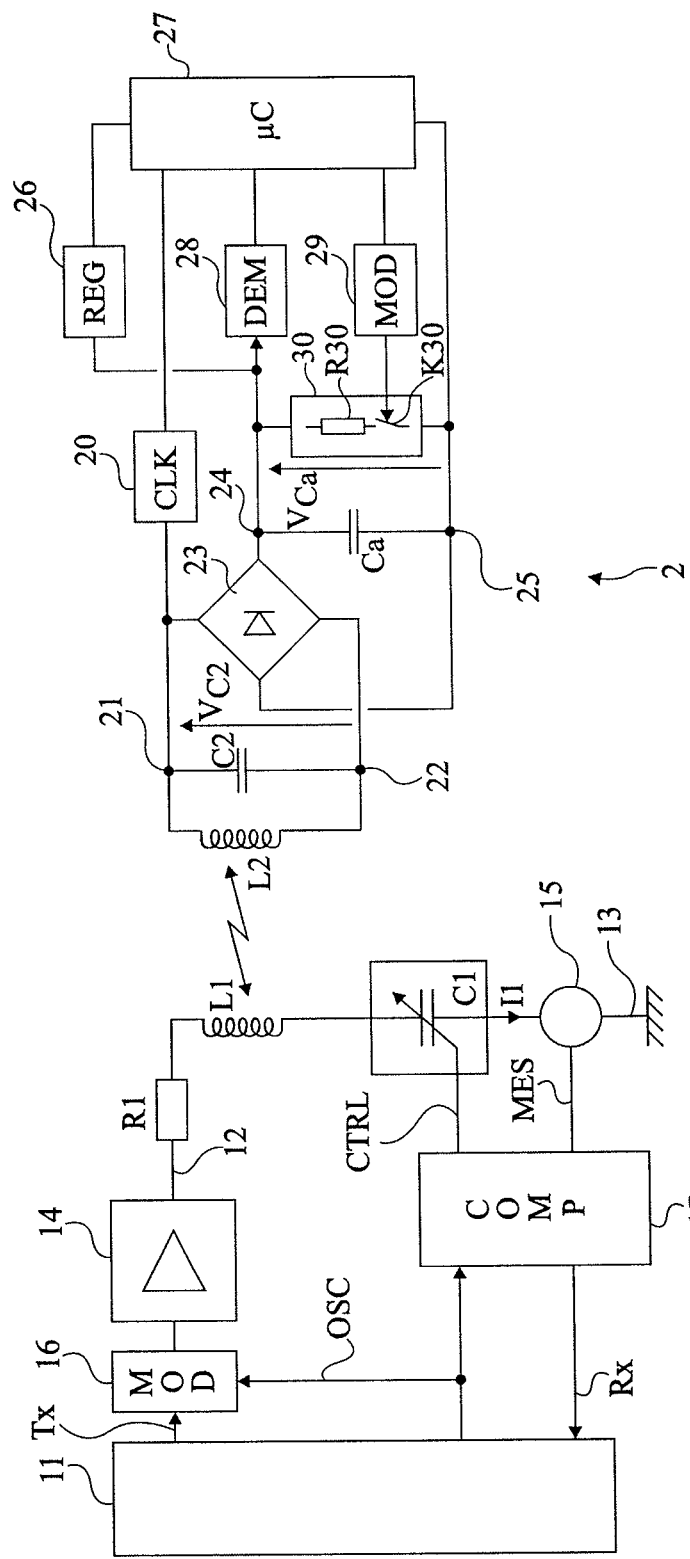
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1 which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES about current I1 in the oscillating circuit detected by measurement element 15 (for example, a current transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

Regulating the phase on the terminal side allows using current and voltage measurements in the oscillating circuit of the transponder to deduce, from these measurements, information relative to the transponder coupling when it is in the field of the terminal. The coupling coefficient between the oscillating circuit of the terminal and of the transponder essentially depends on the distance separating the transponder from the terminal. The coupling coefficient, noted k, is always between 0 and 1. It can be defined by the following formula:

$$k = \frac{M}{\sqrt{L1 \cdot L2}}, \quad \text{(formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is maximum. This optimum coupling, noted $k_{opt}$, may be expressed as:

$$k_{opt} = \sqrt{\frac{L2}{L1} \cdot \frac{R1}{R2}}, \quad \text{(formula 2)}$$

where R2 represents the resistance equivalent to the load formed by the elements of the transponder on its own oscillating circuit. In other words, resistor R2 represents the equivalent resistance of all the circuits of transponder 2, placed in parallel on capacitor C2 and inductance L2 (before or after the rectifying bridge). The conductance due to the transponder circuits will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
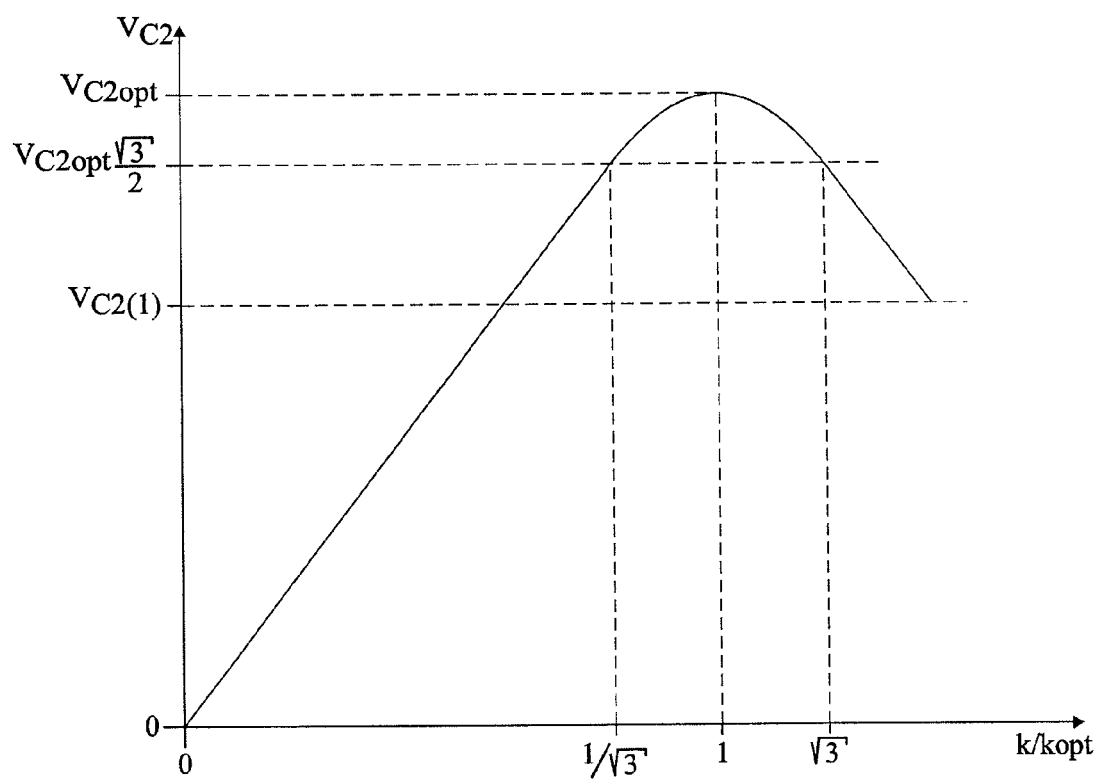
FIG. 3 illustrates an example of the variation of the voltage across the oscillating circuit of the transponder according to the coupling factor.

FIG. 3 shows an example of the shape of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance of the transponder to the terminal such that no signal can be sensed by the transponder. Voltage $V_{C2}$ reaches a maximum $V_{C2opt}$ for optimum coupling coefficient $k_{opt}$ ($k/k_{opt}=1$), then decreases to an intermediary value $V_{C2}(1)$ reached at coupling k=1.

As illustrated in FIG. 3, voltage $V_{C2}$ crosses two points of inflexion for coupling values corresponding to ratios $k/k_{opt}=1/\sqrt{3}$ and $k/k_{opt}=\sqrt{3}$, for which voltage $V_{C2}$ takes value $$V_{C2opt} \cdot \frac{\sqrt{3}}{2}.$$

To have the transponder evaluate its coupling with the terminal, the information of voltage $V_{C2}$ across capacitive element C2 of its oscillating circuit is exploited. This voltage is provided by the following relation:

$$V_{C2} = \frac{I2}{\omega \cdot C_2}, \quad \text{(formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(formula 5)}$$

where X2 represents the imaginary part of the impedance of the oscillating circuit $$\left(X2 = \omega \cdot L2 - \frac{1}{\omega \cdot C2}\right).$$

Further, current I1 in the oscillating circuit of the terminal is given by the following relation:

$$I1 = \frac{Vg}{Z1_{app}}, \quad \text{(formula 6)}$$

where Vg designates a so-called generator voltage, exciting the oscillating circuit of the terminal, and where $Z1_{app}$ represents the apparent impedance of the oscillating circuit.

Regulating the phase of the oscillating circuit of the terminal allows for all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(formula 7)}$$

Since the oscillating circuits are tuned, it can be considered that imaginary part X2 of impedance Z2 is, as a first approximation, close to zero. As a result, the value of impedance Z2 can be written as:

$$Z2 = \frac{L2}{R2 \cdot C2}. \quad \text{(formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{V_g}{\frac{R1}{R2} + k^2 \cdot \frac{L1}{L2}}. \quad \text{(formula 9)}$$

In optimum coupling position $k_{opt}$, maximum voltage $V_{C2opt}$ is thus provided by the following formula (combining formulas 2 and 9):

$$V_{C2opt} = \frac{V_g}{2} \cdot \sqrt{\frac{R2}{R1}}. \quad \text{(formula 10)}$$

It should be noted that formula 9 can only be applied when an oscillating circuit of transponder L2-C2 is considered to be set to the tuning frequency, that is, $\omega \cdot \sqrt{L2 \cdot C2} = 1$.

By combining formulas 9 and 10 and expressing the coupling as normalized by the optimum coupling ($k/k_{opt}$), the following expression of voltage $V_{C2}$ is obtained:

$$V_{C2} = 2 \cdot V_{C2opt} \cdot \frac{\frac{k}{k_{opt}}}{1 + \left(\frac{k}{k_{opt}}\right)^2}. \quad \text{(formula 11)}$$

For a given coupling value k, considering that the impedance of the oscillating circuit of the terminal does not vary and that the circuits remain tuned, the ratio between current coefficients k and optimum coefficients $k_{opt]R20}$ and $k_{opt]R21}$, respectively for a resistor R2 of value R20 and of value R21 provides, according to formula 2, the following expression:

$$\frac{\frac{k}{k_{opt]R20}}}{\frac{k}{k_{opt]R21}}} = \sqrt{\frac{R20}{R21}}. \quad \text{(formula 12)}$$

Still, for a given coupling value k and considering that the impedance of the oscillating circuit of the terminal does not vary and that the circuits remain tuned, the ratio between values $V_{C2]R21}$ and $V_{C2]R20}$ of voltage $V_{C2}$, respectively for values R21 and R20 of resistor R2, provides the following relation:

$$\frac{V_{C2]R21}}{V_{C2]R20}} = \frac{\left(\frac{k}{k_{opt]R20}}\right)^2 + 1}{\left(\frac{k}{k_{opt]R20}}\right)^2 + \frac{R20}{R21}}. \quad \text{(formula 13)}$$

Formula 13 shows that if the value of resistor R2 is increased from a first value R20 to a second greater value R21 (which amounts to decreasing the load of the transponder circuits on oscillating circuit L2-C2), voltage $V_{C2]R21}$ will be greater than voltage $V_{C2]R20}$.

It is provided to take advantage of this feature to evaluate the position of coupling k with respect to its optimum value $k_{opt]R20}$ with a first value of resistance R20.

Indeed, for a coupling position $k_{opt]R20}$ corresponding to the optimum coupling with resistor R20, formula 12 enables to write, with voltage $V_{C2]R20}$ equal to $V_{C2opt]R20}$:

$$\frac{V_{C2]R21}}{V_{C2opt]R20}} = \frac{2}{1 + \left(\frac{R20}{R21}\right)}. \quad \text{(formula 14)}$$

It is provided to use these relations to determine, based on a ratio "r" between voltages $V_{C2]R21}$ and $V_{C2]R20}$ with known resistance values R21 and R20, the transponder position with respect to the optimum coupling $k_{opt]R20}$.

If $$\frac{V_{C2]R21}}{V_{C2]R20}} < \frac{2}{1 + \left(\frac{R20}{R21}\right)}, \quad \text{(formula 16)}$$

then current coupling k is smaller than optimum coupling $k_{opt]R20}$.

Conversely, if $$\frac{V_{C2]R21}}{V_{C2]R20}} > \frac{2}{1 + \left(\frac{R20}{R21}\right)}, \quad \text{(formula 15)}$$

then current coupling k is greater than optimum coupling $k_{opt]R20}$. If the two values are equal, this means that the optimum coupling point has been reached.

In practice, rather than a direct measurement of voltage $V_{C2}$ across the oscillating circuit of the transponder, a measurement of the smoothed voltage across voltage $V_{Ca}$ at the output of rectifying bridge 23 is performed. Voltage $V_{Ca}$ is proportional to voltage $V_{C2}$. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferentially, digitally over several bits, the number of which depends on the desired accuracy of analysis.

The estimate of current coupling position k with respect its optimum value may be refined by estimating the position with respect to the points of inflexion of the curve of FIG. 3. Indeed, for coupling positions where ratio $k/k_{opt}=1/\sqrt{3}$ and $k/k_{opt}=\sqrt{3}$, formula 13 enables to write:

$$r = \frac{4}{1 + 3 \cdot \left(\frac{R20}{R21}\right)}, \text{ and} \quad \text{(formula 17)}$$

$$r = \frac{4}{3 + \left(\frac{R20}{R21}\right)}. \quad \text{(formula 18)}$$

Figure 4:
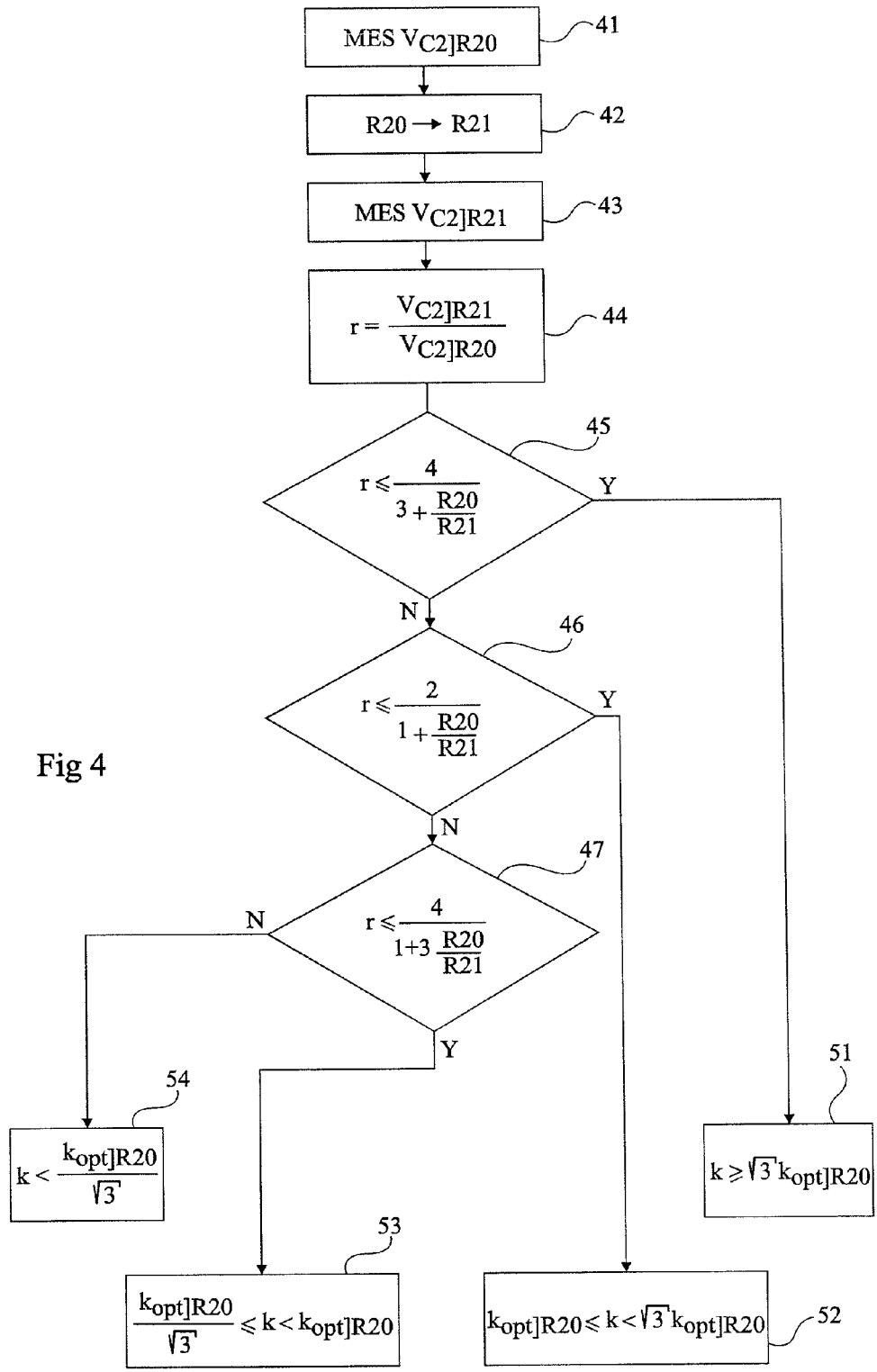
FIG. 4 is a functional block diagram illustrating an embodiment of the method for evaluating the coupling factor.

FIG. 4 illustrates the implementation of such an embodiment. To simplify the discussion of FIG. 4, it is still referred to values $V_{C2]R20}$ and $V_{C2]R21}$, knowing that it is in practice easier to measure values $V_{Ca]R20}$ and $V_{Ca]R21}$ of voltage $V_{Ca}$ but that this changes nothing as to the comparison thresholds of ratio r.

It is started (block 41, MES $V_{C2]R20}$) by measuring and storing the voltage across capacitor C2 with a first value R20 of resistor R2. Then (block 42, R20–>R21), the value of the resistive element is modified towards a greater value.

Then (block 43, $V_{C2]R21}$), voltage $V_{C2}$ is measured with resistance value R21, which is stored.

Ratio r between the measured voltages is then calculated and stored (block 44, $$r = \frac{V_{C2]R21}}{V_{C2]R20}})$$

to be compared with the different thresholds enabling to determine the position of the coupling with respect to the optimum coupling and to the characteristic points where $k/k_{opt}=1/\sqrt{3}$ and $k/k_{opt}=\sqrt{3}$. As a variation, ratio r is calculated for each subsequent comparison.

For example, it is started by comparing (block 45, $$r \leq \frac{4}{3 + \left(\frac{R20}{R21}\right)})$$

ratio r with a threshold corresponding to point $k/k_{opt]R20}=\sqrt{3}$. If r is smaller than or equal to this threshold (output Y of block 45), processing circuit 27 provides the information (block 51, $k \geq \sqrt{3} \cdot k_{opt]R20}$) that the current coupling is greater than or equal to optimum coupling $k_{opt]R20}$, multiplied by $\sqrt{3}$.

If r is greater than the first threshold (output N of block 45), it is tested (block 46, $$r \leq \frac{2}{1 + \left(\frac{R20}{R21}\right)})$$

whether it is smaller than or equal to a second threshold corresponding to optimum coupling $k_{opt]R20}$. If so (output Y of block 46), the current coupling ranges between the optimum coupling and its product by $\sqrt{3}$ (block 52, $k_{opt]R20} \leq k < \sqrt{3} \cdot k_{opt]R20}$).

If not (output N of block 46), it is tested (block 47, $$r \leq \frac{4}{1 + 3 \cdot \left(\frac{R20}{R21}\right)})$$

whether r is smaller than or equal to a third threshold corresponding to point $k/k_{opt]R20}=1/\sqrt{3}$. If so (output Y of block 47), the current coupling ranges between the optimum coupling and the quotient of the optimum coupling over $\sqrt{3}$ (block 53, $$\frac{k_{opt]R20}}{\sqrt{3}} \leq k < k_{opt]R20}).$$

If not (output N of block 47), the current coupling is lower than the optimum coupling divided by $\sqrt{3}$ (block 54, $$k < \frac{k_{opt]R20}}{\sqrt{3}}).$$

Once the measurements have been performed with value R21, it is returned to value R20, which is considered as nominal. This return to the nominal value preferably occurs as soon as the measurement has been performed (before step 44). It may however be provided for it to occur later in the process, for example, at the end of the evaluation.

It is thus possible, with two voltages measurements with two resistance values of the oscillating circuit of the transponder, to have said transponder determine the current coupling with the terminal with respect to an optimum coupling.

The evaluation may also be performed by decreasing the value of resistor R2. It will however be ascertained for the value to be sufficient to preserve a sufficient value $V_{C2]R21}$ of voltage $V_{C2}$ to ensure the power supply of the transponder circuits.

Figure 5:
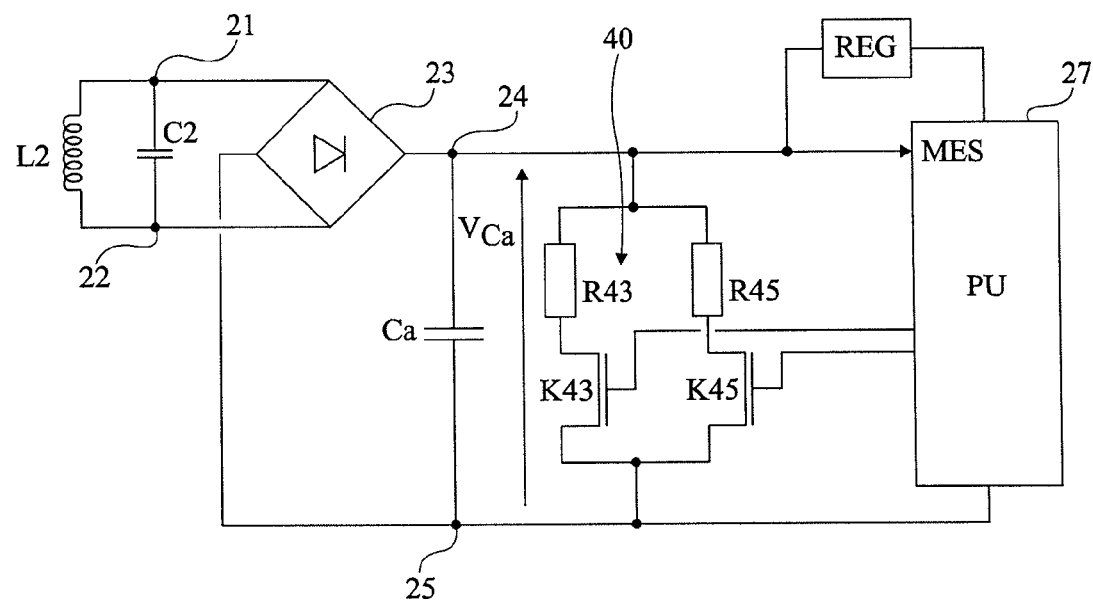
FIG. 5 is a block diagram of an embodiment of a transponder capable of evaluating its coupling factor with a terminal.

FIG. 5 is a block diagram of an embodiment of a transponder 2, equipped to automatically determine, when it is in the field of a terminal (not shown), the current coupling with respect to the optimum coupling. The representation of FIG. 5 is simplified with respect to that of FIG. 2. In particular, the elements of demodulation, retromodulation, and for obtaining the clock frequency have not been illustrated.

As previously, transponder 2 is based on a parallel oscillating circuit L2-C2 having its terminals 21 and 22 connected to the input terminals of a rectifying bridge 23. A switchable resistive circuit 40 is provided between terminals 24 and 25 of rectifying bridge 23. For example, two resistors R43 and R45 are connected in parallel, each being in series with a switch K43, respectively K45. Switches K43 and K45 (for example, MOS transistors) are intended to be switched to implement the method for determining the coupling position. Processing unit 27 (PU) receives information about voltage $V_{Ca}$ on an input MES to implement the above-described method. In the example of FIG. 5, where both resistors R43 and R45 are functionally connected, resistor R2 (load of the transponder circuits) represents value R20. The disconnection of one of the resistors (for example, resistor R43) increases resistance R2 towards value R21. Other connections and switchings may be provided according to the implemented variation of the method. For example, a single switchable resistor may be used, considering that one of the two values of resistor R2 corresponds to the resistive load of the other transponder circuits.

According to a preferred embodiment, the switchable resistor corresponds to that used for a resistive retromodulation. A first measurement is performed by switching the retromodulation resistor so that it is functionally in the circuit (switch K30 in the on state in the example of FIG. 2). Voltage $V_{C2|R20}$ is measured. Then, switch K30 is turned off and voltage $V_{C2|R21}$ is measured. The implementation of the described method then requires no structural modification of a transponder equipped with a microcontroller. It is sufficient to program this microcontroller to switch, as well as the retromodulation resistor.

The thresholds used to determine the position with respect to the optimum coupling only depend on values R20 and R21, which are known for a given transponder. Accordingly, the transponder does not necessarily need advanced microprocessor-type calculation means, but can simply measure the voltages, calculate the ratio, and compare it with analog thresholds generated, for example, by resistive dividing bridges. According to another example, the thresholds are pre-calculated and stored in a non-volatile memory of the transponder.

As a variation, the increase or the decrease of equivalent resistance R2 is caused by a variation of the power consumption of the transponder circuits, typically of processing unit 27. For example, to decrease the value of resistor R2 (increase the power consumption), the execution of calculations or of a processing by unit 27 is triggered. An increase in equivalent resistance R2 may also be caused by a decrease in the power consumption of unit 20 caused by the interruption of some of the calculations. The variation of resistance R2 is known from that time when the power consumption of different tasks to be executed by unit 27 is known, which is generally estimated on design of the transponder or may be obtained in a training phase with any terminal.

The calculations required to evaluate the current coupling are sufficiently simple for their execution time to be negligible with respect to the displacement speed of a transponder in front of a terminal (and thus the speed of the variation of the coupling coefficient). The described embodiments are further applicable to the case where the transponder remains laid on a reception surface of the terminal, where the coupling does not vary during the entire communication.

Knowing the current coupling coefficient with respect to the optimum coupling may have several applications.

For example, this information may be used to detect a risk of overheating of the transponder. Indeed, when the coupling is close to the optimum coupling, the power recovered by the transponder is maximum. A possible overheating can then be avoided by causing a detuning of the oscillating circuit, for example, by providing a switchable capacitive element for detuning oscillating circuit L2-C2. It is provided to detune the oscillating circuit if ratio $k/k_{opt}$ ranges between two thresholds around the optimum coupling position. A detuning may, for example, be selected when coupling coefficient k ranges between $k_{opt}/\sqrt{3}$ and $k_{opt}\cdot\sqrt{3}$.

According to another example of application, knowing the coupling position with respect to the optimum coupling enables improving the power management in the communication with a terminal. The functions executed by the processing unit of the transponder can thus be selected according to the available power.

The coupling may be evaluated periodically during a communication. The only precaution to be taken is not to evaluate the coupling during a retromodulation of the transponder. A first evaluation is, for example, performed as soon as the power recovered by the transponder is sufficient for microprocessor 27 to operate. Then, periodic measurements are performed during the communication.

According to still another example, the position of the current coupling with respect to the optimum coupling is transmitted to the terminal so that it adapts the communication (the requests that it sends to the transponder) to the power available for the transponder, which conditions its calculating capacity.

It should be noted that the determination of the coupling occurs without it being necessary to establish a communication with the terminal.

Further, the optimum coupling value varies from one terminal to another. Evaluating the current coupling with respect to the optimum coupling as described hereabove allows not to have to depend on the characteristics of a given terminal and makes the evaluation independent from the terminal. Thus, a transponder equipped with the means for evaluating the coupling of the present invention may operate with any existing terminal.

Various embodiments with different variations have been described hereabove. It should be noted that those skilled in the art can combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for evaluating a current coupling factor between an electromagnetic transponder and a terminal, comprising:
   obtaining data, representative of a voltage across an oscillating circuit of the transponder for two values of a resistive load, and
   comparing a ratio with one or several thresholds, wherein the ratio is between the data representative of the voltage across the oscillating circuit for the two values of the resistive load.

2. The method of claim 1, further comprising determining, based on a result of the comparing, a position of the current coupling factor with respect to an optimum coupling position with a first of the two values of the resistive load.

3. The method of claim 2, wherein obtaining the data representative of the voltage across the oscillating circuit comprises:
   measuring and storing first data, relative to a level of a D.C. voltage provided by a rectifier connected across the oscillating circuit, for a first value of the resistive load; and
   measuring and storing second data, relative to the level of said D.C. voltage, for a second value of the resistive load.

4. The method of claim 2, wherein a threshold of said one or several thresholds is a function of said values of the resistive load.

5. The method of claim 2, wherein obtaining the data representative of the voltage across the oscillating circuit comprises: modifying a power consumption of processing circuits comprised by the transponder, thereby varying a value of the resistive load between the first and second values.

6. The method of claim 2, wherein obtaining the data representative of the voltage across the oscillating circuit comprises: switching a resistive retromodulation element comprised by the transponder, thereby varying a value of the resistive load between the first and second values.

7. A method for protecting an electromagnetic transponder against a possible overheating based on an evaluation of the coupling according to claim 1, comprising detuning the oscillating circuit if the ratio between a current coupling factor and an optimum coupling ranges between two thresholds.

8. An electromagnetic transponder comprising:
an oscillating circuit, upstream of a rectifying circuit capable of providing a D.C. voltage when the transponder is present in a magnetic field of a terminal; and
at least one processing unit configured to implement the method of claim 1.

9. The transponder of claim 8, further comprising at least one switchable resistive element capable of being functionally connected in parallel on the oscillating circuit.

10. The transponder of claim 9, wherein said switchable resistive element is connected to output terminals of the rectifying circuit.

11. The method of claim 2, wherein the data are obtained for a tuned configuration of the oscillating circuit.

12. The transponder of claim 8, wherein the data are obtained for a tuned configuration of the oscillating circuit.

13. An electronic system comprising:
a transponder; and
a terminal,
wherein the transponder includes:
an oscillating circuit, upstream of a rectifying circuit capable of providing a D.C. voltage when the transponder is present in a magnetic field of the terminal, and
at least one processing unit configured to obtain data representative of a voltage across the oscillating circuit for two values of a resistive load, and to compare a ratio with one or several thresholds, the ratio being between the data representative of the voltage across the oscillating circuit for the two values of the resistive load, and
wherein the terminal includes an oscillator configured to generate the magnetic field.

14. A method comprising:
obtaining data representative of first and second levels of a voltage across an oscillating circuit of a transponder for respective first and second values of a resistive load and for a tuned configuration of the oscillating circuit, and
evaluating a coupling between the transponder and a terminal based on the obtained data.

15. The method of claim 14, wherein:
evaluating the coupling between the terminal and the transponder comprises providing a position of the transponder with respect to an optimum coupling position, and/or a value of a coupling factor with respect to an optimum coupling factor, and
the coupling factor characterizes the coupling between the transponder and the terminal.

16. The method of claim 15, wherein evaluating the coupling further comprises comparing a ratio of the first and second voltage levels with one or more thresholds.

17. The method of claim 15, further comprising detuning the oscillating circuit of the transponder if the coupling factor ranges between two thresholds, and/or the ratio of the coupling factor to the optimum coupling factor ranges between two thresholds.

18. The method of claim 17, wherein detuning the oscillating circuit of the transponder comprises adjusting a capacitance of the oscillating circuit.

19. The method of claim 15, wherein said a threshold of said thresholds depends on the first or second value of the resistive load.

20. The method of claim 15, further comprising adjusting a value of the resistive load from the first value to second value by modifying the power consumption of a processing circuit of the transponder.

21. The method of claim 15, further comprising adjusting a value of the resistive load from the first value to second value by switching a switchable resistive circuit of the transponder.

22. The method of claim 15, wherein the configuration of the oscillating circuit of the transponder is tuned when a frequency of the oscillating circuit of the transponder is the same as an excitation frequency of an oscillating circuit of the terminal.

23. A transponder comprising:
an oscillating circuit configured to provide a signal in response to a magnetic field of a terminal;
a rectifying circuit configured to rectify a voltage of a signal provided by the oscillating circuit;
one or more circuits configured to form a resistive load; and
at least one processing unit configured to:
obtain data representative of first and second levels of a voltage across the oscillating circuit for respective first and second values of the resistive load and for a tuned configuration of the oscillating circuit, and
evaluate a coupling between the transponder and the terminal based on the obtained data.

24. The transponder of claim 23, further comprising an element configured to adjust a frequency of the oscillating circuit.

25. The transponder of claim 24, wherein the element is a switchable capacitive element.

26. The transponder of claim 23, wherein the one or more circuits comprise a switchable resistive element configured to vary a resistance of the resistive load.

27. The transponder of claim 26, wherein the switchable resistive element is connected to output terminals of the rectifying circuit.

28. The transponder of claim 26, wherein the switchable resistive element is configured to perform resistive retro-modulation.

29. The transponder of claim 23, wherein the at least one processing unit is configured to evaluate the coupling by:
obtaining a ratio of the first and second voltage levels;
comparing the ratio to one or more thresholds; and
providing a position of the transponder with respect to an optimum coupling position, and/or a value of a coupling factor with respect to an optimum coupling factor, wherein the coupling factor characterizes the coupling between the transponder and the terminal.

30. An electronic system comprising:
a transponder; and
a terminal,
wherein the transponder includes:
an oscillating circuit configured to provide a signal in response to a magnetic field of a terminal,
a rectifying circuit configured to rectify of a voltage of a signal provided by the oscillating circuit,
one or more circuits configured to form a resistive load, and
at least one processing unit configured to obtain data representative of first and second levels of a voltage across the oscillating circuit for respective first and second values of the resistive load and for a tuned configuration of the oscillating circuit, and to evaluate a coupling between the transponder and the terminal based on the obtained data, and wherein the terminal includes an oscillator configured to generate the magnetic field.

31. A transponder comprising:
an oscillating circuit configured to provide a signal in response to a magnetic field of a terminal;
a rectifying circuit configured to rectify of a voltage of a signal provided by the oscillating circuit;
one or more circuits configured to form a resistive load; and
means for determining a coupling between the transponder and the terminal, wherein determining the coupling includes: obtaining data, representative of a voltage across the oscillating circuit for two values of the resistive load, and comparing a ratio with one or several thresholds, the ratio being between the data representative of the voltage across the oscillating circuit for the two values of the resistive load.

32. A transponder comprising:
an oscillating circuit configured to provide a signal in response to a magnetic field of a terminal;
a rectifying circuit configured to rectify of a voltage of a signal provided by the oscillating circuit;
one or more circuits configured to form a resistive load; and
means for determining a coupling between the transponder and the terminal, wherein determining the coupling includes: obtaining data representative of first and second levels of a voltage across the oscillating circuit for respective first and second values of the resistive load and for a tuned configuration of the oscillating circuit, and evaluating the coupling based on the obtained data.

* * * * *